United States Patent [19]

Rao et al.

[11] Patent Number: 5,332,424
[45] Date of Patent: Jul. 26, 1994

[54] HYDROCARBON FRACTIONATION BY ADSORBENT MEMBRANES

[75] Inventors: Madhukar B. Rao, Allentown; Shivaji Sircar, Wescosville; Joseph M. Abrardo, Schnecksville; William F. Baade, Breinigsville, all of Pa.

[73] Assignee: Air Products and Chemicals, Inc., Allentown, Pa.

[21] Appl. No.: 98,654

[22] Filed: Jul. 28, 1993

[51] Int. Cl.$^5$ .................. B01D 53/04; B01D 53/22
[52] U.S. Cl. .......................... 95/47; 62/18; 95/49; 95/50; 95/51; 95/143
[58] Field of Search ............ 62/18, 20; 95/45, 50, 95/90, 143, 47–49, 51; 585/818, 819

[56] References Cited

U.S. PATENT DOCUMENTS

| | | | |
|---|---|---|---|
| 2,540,151 | 2/1951 | Weller et al. | 183/115 |
| 2,617,493 | 11/1952 | Jones | 95/49 |
| 3,713,271 | 1/1973 | Franz et al. | 55/16 |
| 4,077,779 | 3/1978 | Sircar et al. | 95/143 X |
| 4,104,037 | 8/1978 | Garrett et al. | 55/16 |
| 4,180,388 | 12/1979 | Graham | 55/16 |
| 4,398,926 | 8/1983 | Doshi | 55/16 |
| 4,435,191 | 3/1984 | Graham | 55/16 |
| 4,547,205 | 10/1985 | Steacy | 95/143 X |
| 4,623,704 | 11/1986 | Dembicki et al. | 526/68 |
| 4,654,063 | 3/1987 | Auvil et al. | 62/18 |
| 4,687,498 | 8/1987 | Maclean et al. | 95/143 X |
| 4,689,062 | 8/1987 | MacLean et al. | 95/143 |
| 4,690,695 | 9/1987 | Doshi | 55/16 |
| 4,701,187 | 10/1987 | Choe et al. | 55/16 |
| 4,717,407 | 1/1988 | Choe et al. | 62/18 |
| 4,836,833 | 6/1989 | Nicholas et al. | 55/16 |
| 4,842,718 | 6/1989 | Luteijn et al. | 95/50 X |
| 4,857,078 | 8/1989 | Watler | 95/50 |
| 5,012,037 | 4/1991 | Doshi et al. | 95/143 X |
| 5,104,425 | 4/1992 | Rao et al. | 55/16 |
| 5,127,925 | 7/1992 | Kulprathipanja et al. | 95/54 |
| 5,133,785 | 7/1992 | Kumar et al. | 95/143 X |
| 5,185,014 | 2/1993 | Prasad | 55/16 |

FOREIGN PATENT DOCUMENTS

| | | |
|---|---|---|
| 3315930 | 3/1984 | Fed. Rep. of Germany . |
| 58-120502 | 7/1983 | Japan . |
| 62-153389 | 7/1987 | Japan . |
| 62-153390 | 7/1987 | Japan . |

OTHER PUBLICATIONS

Sengupta, A. et al; "Ternary Gas Mixture Separation in Two-Membrane Permeators"; *AIChE Journal*; Apr. 1987; vol. 33; No. 4; 529–539.

*Primary Examiner*—Robert Spitzer
*Attorney, Agent, or Firm*—John M. Fernbacher; James C. Simmons; William F. Marsh

[57] ABSTRACT

A method is disclosed for separating a multicomponent gas mixture comprising at least three components into three product streams by use of adsorbent membrane zones operating in series. Each product is enriched in a different component based upon the relative strength of adsorption of each component on the adsorbent material. A non-permeate primary component product is obtained by the selective adsorption and permeation through the adsorbent membranes of secondary components which are more strongly adsorbed than the primary components in the gas mixture. Two or more permeate streams enriched in the more strongly adsorbed components are withdrawn from the membrane zones as individual secondary products, each of which contains a different component distribution determined by the relative strength of adsorption of the secondary components on the adsorbent material. Increased recovery and product purity are realized by the integration of pressure swing adsorption (PSA) and cryogenic separation systems with the adsorbent membrane zones. PSA reject gas is used as a membrane sweep gas to increase the permeation rates of secondary components.

17 Claims, 3 Drawing Sheets

HYDROCARBON FRACTIONATION BY ADSORBENT MEMBRANES

FIELD OF THE INVENTION

This invention is directed towards the separation of gas mixtures by adsorptive membranes, and in particular to the recovery and fractionation of hydrocarbons from hydrogen-hydrocarbon mixtures.

BACKGROUND OF THE INVENTION

Gas separation by adsorbent membranes is a new separation method which exhibits superior performance characteristics for many gas mixtures compared with well-known separation methods using polymeric or porous bulk diffusion membranes. Adsorbent membranes are particularly useful for the recovery of light gases such as hydrogen from mixtures containing other components, wherein these other components selectively permeate through the membrane and hydrogen is recovered as a non-permeate product at a pressure only slightly below the feed pressure. By comparison, polymeric membranes operate in an opposite mode in which the hydrogen selectively permeates through the membrane and is recovered at a pressure far lower than the feed pressure, and other components are recovered in a non-permeate stream at a pressure slightly below the feed pressure. The characteristics and methods of making adsorbent membranes are described in U.S. Pat. No. 5,104,425 which is incorporated herein by reference.

Staged membranes in series are disclosed in the art in which either the permeate or non-permeate stream from a first stage is passed to one or more additional stages to improve efficiency and/or recovery of the component being recovered. U.S. Pat. No. 4,180,388 discloses a two-stage membrane system in which the non-permeate stream from the first stage passes to a second stage for additional permeate recovery. The feed to permeate pressure ratio in the first stage is lower than the feed to permeate pressure ratio of the second stage. Polymeric membranes are taught for use in the process. U.S. Pat. No. 4,435,191 teaches the use of three membrane stages in series for recovering an aggressive gas such as $CO_2$ by permeation through polymeric membranes. The feed through the stages is compressed between the stages such that each stage operates at a successively higher pressure on the feed side. U.S. Pat. No. 4,623,704 discloses the recovery of an enriched ethylene stream from polyethylene polymerization off-gas containing unreacted ethylene. The recovered unreacted ethylene stream comprises the combined permeate streams from three membrane modules in series, each module having a solid semipermeable membrane such as cellulose acetate. U.S. Pat. No. 4,104,037 teaches a multi-stage gaseous diffusion system for separating uranium isotopes in the form of gaseous fluorides. The diffusion stages utilize porous membranes which separate gases by molecular weight using the mechanism of bulk pore diffusion. U.S. Pat. No. 3,713,271 discloses the recovery of helium from natural gas using multi-stage membrane permeators in which helium selectively diffuses through the membrane material. Other components in the gas, namely nitrogen and methane, have very low permeability through the membranes and are withdrawn as non-permeate byproduct. U.S. Pat. No. 2,540,151 teaches the separation of oxygen from air in the multiple-stage membrane system using polymeric membranes in which the permeate from a given stage is compressed and passed to the feed side of the succeeding stage. Non-permeate product from a given stage is recycled as feed to the preceding stage. Final products are an oxygen-rich stream and an oxygen-lean stream.

Each background patent discussed above is characterized by at least one of the following features: (1) each stage is operated at a different pressure ratio (defined as the ratio of feed pressure to permeate pressure); (2) only one permeate product and one non-permeate product are withdrawn, and staging is used only to increase the recovery or purity of either the permeate or non-permeate stream; and (3) the membrane material used is either a polymeric membrane or a porous membrane which separates gases based on molecular weight by bulk pore diffusion.

In the background art described above, the term "stage" is used to define two or more membrane zones arranged in series, but the term is applied in several different contexts with respect to the relationship among the stages. U.S. Pat. No. 4,180,388 cited above describes a two-stage system in which non-permeate gas from a first stage passes as feed to a second stage, and a separate permeate stream is withdrawn from each stage at a pressure different from the permeate from other stages. A similar three-stage system is described in U.S. Pat. No. 4,435,191 in which three separate permeate streams are withdrawn from the three stages. U.S. Pat. Nos. 2,540,151 and 4,104,037 cited above both utilize multistage membranes in series wherein the feed gas to a given stage consists of non-permeate gas from the preceding stage combined with permeate gas from the succeeding stage. Thus in the background art described herein the term "stage" is used in several different contexts with respect to the process relationships among the stages.

The use of a membrane permeator with two different membrane materials is described in a paper entitled "Ternary Gas Mixture Separation in Two-Membrane Permeators" by A. Sengupta and K. K. Sirkar in the *AIChE Journal*, Vol. 33, No. 4, April 1987, pp. 529–539. The use of two different membrane materials allows the separation of ternary gas mixtures into three different products.

The separation of gas mixtures by combinations of membrane systems and pressure swing adsorption (PSA) systems are disclosed by representative U.S. Pat. Nos. 4,398,926; 4,654,063; 4,690,695; 4,701,187; 4,717,407 and 4,836,833. Each of these patents is characterized by at least one of the following features: (1) only single stage membrane systems are utilized; (2) the membrane system feed is obtained from a PSA system; and (3) light components, i.e. helium or hydrogen, preferentially diffuse through the membrane which indicates the use of a polymeric membrane.

Improved methods of separating gas mixtures by membranes and membrane/adsorption combinations will enable the separation of important industrial gas mixtures to be realized more efficiently and economically. Such advances in the gas separation art will benefit diverse applications including oxygen and nitrogen production, helium recovery, hydrogen recovery, hydrocarbon fractionation, synthesis gas production, and other economically important gas-related processes. The improved separation methods disclosed in the following specification and defined by the appended claims advance the gas separation art and offer more

SUMMARY OF THE INVENTION

The present invention is an improved method for effecting a ternary separation of a gas mixture containing at least one primary component and at least two secondary components, in which the secondary components are all more strongly adsorbed on an adsorbent material than the primary components, and in which the secondary components have relative adsorptive characteristics on the adsorbent material which range from most strongly adsorbed to least strongly adsorbed. The method comprises passing the mixture as a feed stream successively through the feed sides of two or more membrane zones or stages in series, in which each membrane zone has an adsorbent membrane containing the adsorbent material which divides the zone into a feed side and a permeate side. As the feed passes successively through the feed side of each membrane zone, it is depleted of the most strongly adsorbed secondary components in the first membrane zone and the least strongly adsorbed components in the last membrane zone. The permeate withdrawn from the permeate side of the first zone is enriched in the most strongly adsorbed secondary components and the permeate withdrawn from the permeate side of the last membrane zone is enriched in the least strongly adsorbed components. The non-permeate stream withdrawn from the feed side of the last membrane zone is depleted in secondary components and thus is enriched in the primary components. The method provides at least three products from a gas mixture containing three or more components, e.g., a product enriched in primary components, a product enriched in the most strongly adsorbed secondary components, and a product enriched in the least strongly adsorbed components.

The separation of the present invention is achieved through the mechanism of selective surface flow in which the secondary components are selectively adsorbed from the feed stream in the successive membrane zones by the adsorbent membrane, diffuse through the membranes as an adsorbed fluid phase, and are withdrawn from the permeate sides of the successive membrane zones to yield the secondary component permeate streams. The feed stream is successively depleted of the secondary components as it passes successively through the feed sides of the series of membrane zones, and the final non-permeate stream withdrawn from the last membrane zone is thus enriched in the primary components.

The method can be improved by further treatment of the primary component-rich non-permeate stream in a pressure swing adsorption (PSA) system which removes a substantial amount of the residual secondary components to yield a high-purity primary component product. In addition, adsorbent membranes can be integrated with cryogenic separation methods and PSA systems to yield improved energy efficiency compared with prior art PSA/cryogenic separation systems.

DETAILED DESCRIPTION OF THE INVENTION

Figure 1:
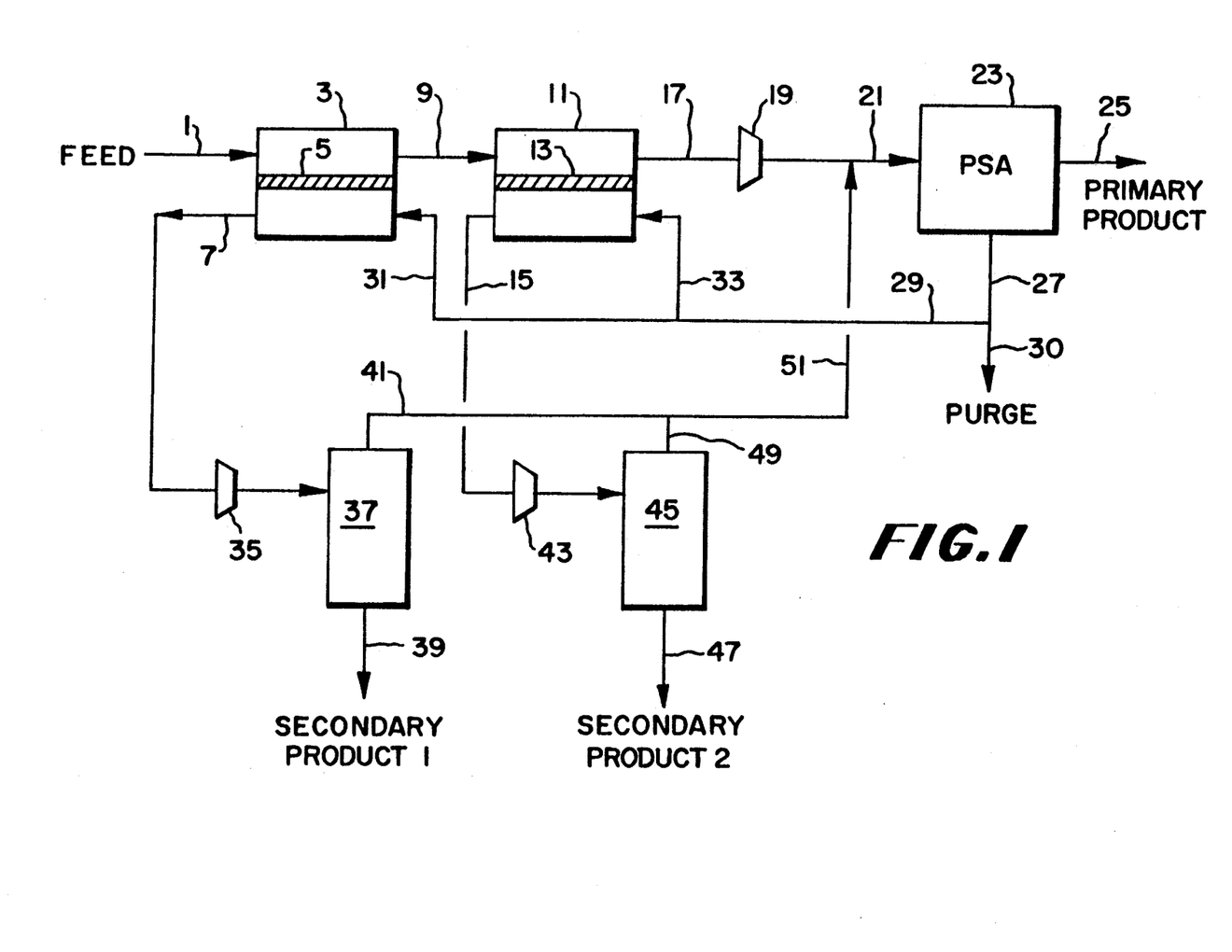
FIG. 1 is a schematic flowsheet for an embodiment of the present invention.

The process of the present invention is illustrated in the schematic flowsheet of FIG. 1. Feed 1 comprises at least three components—at least one primary component and at least two secondary components. The secondary components are more strongly adsorbed on an adsorbent material than the primary components, and the secondary components themselves have relative adsorption characteristics on the adsorbent material ranging from most strongly adsorbed to least strongly adsorbed. A gas mixture of particular interest for separation by the method of the present invention comprises hydrogen as the primary component and two or more secondary components selected from hydrocarbons having up to five carbon atoms, 20 carbon monoxide, carbon dioxide, hydrogen sulfide, and nitrogen. Feed 1 typically at a pressure between 20 and 1,200 psig passes into membrane zone 3 in which significant portions of the most strongly adsorbed secondary components adsorb on adsorbent membrane 5 and diffuse or permeate through the membrane as an adsorbed fluid phase. If feed gas is available at a lower pressure, compression is required (not shown). Permeate 7 comprising most strongly adsorbed secondary components is withdrawn from membrane zone 3. Non-permeate stream 9, now substantially depleted of the most strongly adsorbed secondary components, passes into a second adsorbent zone 11 in which significant portions of the least strongly adsorbed secondary components adsorb on adsorbent membrane 13 and diffuse or permeate through the membrane as an adsorbed fluid phase. Permeate 15 comprising least strongly adsorbed secondary components is withdrawn from membrane zone 11. Permeates 7 and 15 are withdrawn at pressures between 2 and 900 psig. Preferably, permeates 7 and 15 are withdrawn at essentially the same pressure, although they may be withdrawn at different pressures if desired. Non-permeate stream 17, now substantially depleted of secondary components, is withdrawn from membrane zone 11 as a primary component membrane product. Thus feed stream I passes successively through the feed sides of the series membrane zones and is successively depleted of secondary components in the relative order of strength of adsorption from most strongly adsorbed to least strongly adsorbed on the adsorbent membrane.

Membrane zones 3 and 11 can be described alternately as stages, where the term "stage" as used herein with reference to the present invention denotes one of at least two adsorbent membrane zones in series, wherein at least two distinctly different permeate streams are withdrawn from the membrane zones or stages. These different permeate streams are characterized in that the permeate stream from a given stage contains a higher concentration of less strongly adsorbed components than the permeate stream from the preceding stage, or alternately that the permeate stream from a given stage contains a higher concentration of more strongly adsorbed components than the permeate stream from the succeeding stage. The staged adsorbent membrane process of the present invention thus is fundamentally different than the processes described in the previously-cited prior art.

The ratio of feed side pressure to permeate side pressure in each membrane zone is preferably between 1.5 and 10. Generally, recompression between membrane zones is not needed, and the defined pressure ratio is substantially equivalent in each membrane zone. By "substantially equivalent" it is meant that the pressure ratios vary slightly from the first zone to the last zone only because of the small pressure drop of the gas flowing through the feed sides of the membrane zones in series.

The definition of the term "adsorbent membrane" as used in the present disclosure means any gas-permeable membrane containing adsorbent material which selectively adsorbs some of the components in a gas mixture, wherein the adsorbed components permeate through the membrane in an adsorbed fluid phase. The preferred type of adsorbent membrane is described in U.S. Pat. No. 5,104,425 which is incorporated herein by reference. Other types of adsorbent membranes can be utilized in the present invention, for example, membranes which utilize a polymeric material to support the adsorbent material.

The key and unique characteristic of the present invention is that the secondary components are separated from the primary components and simultaneously are fractionated into a secondary product enriched in the most strongly adsorbed secondary components and another secondary product enriched in the less strongly adsorbed secondary components, thereby yielding at least three product streams. This characteristic was neither recognized nor suggested in the prior art of adsorbent membranes and is a result of the unique property of adsorbent membranes in which the more strongly adsorbed components hinder the permeation of the less strongly adsorbed components. It was realized in the present invention that the more strongly adsorbed components reduce the permeation rates of the less strongly adsorbed components to an unexpectedly high degree, particularly for mixtures of light hydrocarbons and hydrogen as illustrated in Example 1 below. This unexpectedly high effect of the more strongly adsorbed components on the permeabilities of the less strongly adsorbed components is the basis for the separation method of the present invention.

The present invention is not limited to the two zones or stages discussed above and illustrated in FIG. 1. Three or more stages can be utilized in series depending on the desired degree of fractionation of the secondary components. For example, if three stages are utilized, the permeate from the first stage would be enriched in the most strongly adsorbed components, the third stage permeate would be enriched in the least strongly adsorbed components, and the second stage permeate would be enriched in the components having adsorption characteristics intermediate the components in the permeates from the first and third stages.

Adsorbent membranes 5 and 13 comprise adsorbent material supported by a porous substrate in which the adsorbent material is a coating on the surface of the substrate. Alternatively, some or all of the adsorbent material is contained within the pores of the substrate. The adsorbent material typically is selected from activated carbon, zeolite, activated alumina, silica, or combinations thereof. Different adsorbent membranes can be used in different stages depending on the types of secondary components to be separated. The characteristics and methods of preparation of adsorbent membranes are described in U.S. Pat. No. 5,104,425 which has been incorporated herein by reference. One type of membrane for use in the present invention is made by coating a porous graphite substrate with a thin film of an aqueous suspension (latex) containing a polyvinylidine chloride-acrylate terpolymer, drying the coated substrate at 150° C. for five minutes, heating the substrate in nitrogen to 1000° C. at a rate of 1° C. per minute, holding at temperature for three hours, and cooling to ambient temperature at 10° C. per minute. The polymer coating is carbonized during the heating step thereby forming an ultrathin layer of microporous carbon on the substrate. Other polymers can be used for coating prior to the carbonization step provided that these polymers can be carbonized to form the required porous carbon adsorbent material. Such alternate polymers can be selected from polyvinyl chloride, polyacrylonitrile, styrene-divinylbenzene copolymer, and mixtures thereof.

The adsorbent membrane and substrate can be fabricated in a tubular configuration in which the microporous adsorbent material is deposited on the inner and/or outer surface of a tubular porous substrate, and the resulting tubular adsorbent membrane elements can be assembled in a shell-and-tube configuration in an appropriate pressure vessel to form a membrane module. Alternatively, the adsorbent membrane and support can be fabricated in a flat sheet configuration which can be assembled into a module using a plate-and-frame arrangement. Alternatively, the adsorbent membrane and support can be fabricated in a monolith configuration to provide a high membrane surface area per unit volume of membrane module. The monolith can be a porous ceramic, porous glass, porous metal, or a porous carbon material. A hollow fiber configuration may be used in which the adsorbent membrane is supported by fine hollow fibers of the substrate material. A plurality of membrane modules in parallel and/or series can be utilized when gas feed rates and separation requirements exceed the capability of a single module of practical size.

In an alternative embodiment of the present invention, primary component membrane product 17 of FIG. 1 is compressed to 100-1200 psig by compressor 19 and the resulting compressed feed 21 passes to pressure swing adsorption (PSA) system 23. PSA system 23 is typically a multiple-bed adsorption system which separates gas mixtures by selective adsorption using pressure swing for adsorption and desorption between higher and lower superatmospheric pressures, as is well known in the art. In some cases, the lower pressure can be subatmospheric, and this version of the process typically is defined as vacuum swing adsorption (VSA). In this specification, the term PSA includes any cyclic adsorption process which utilizes steps at superatmospheric or subatmospheric pressures. PSA system 23 produces a high purity primary component product 25 essentially free of secondary components at a pressure between 150 and 400 psig. PSA reject stream 27 at a pressure between 2 and 50 psig contains the secondary components which were separated from the primary components in the PSA system as well as some primary components typically lost in depressurization and purge steps. A portion 29 of PSA reject stream 27 can be utilized as a sweep gas in one or more of the membrane zones or stages, and final purge stream 30 is withdrawn if necessary. In FIG. 1, portions 31 and 33 of reject stream 29 are used as sweep gas to sweep the permeate sides of membrane zones 3 and 11 respectively, thereby increasing the rate of diffusion or permeability of the secondary components through adsorbent membranes 5 and 13 respectively. Streams 7 and 15 in this embodiment will contain sweep gas and enhanced permeate comprising secondary components. As in the primary embodiment described earlier, stream 7 will be enriched in the most strongly adsorbed components from feed I and stream 15 will be enriched in the least strongly adsorbed components. By sweeping the membrane zones and thus enhancing the permeation rates of secondary components, a higher recovery of primary component product is realized for given membrane area and operating conditions.

In another alternative embodiment of the invention, sweep/permeate stream 7 is compressed in compressor 35 and passes to rectification system 37 which separates the stream into a secondary product 39 which is enriched in the least volatile components and overhead stream 41 which is enriched in the most volatile components in stream 7. Overhead stream 41 optionally can be recycled to PSA system 23 by combining it with compressed primary component membrane product 17 downstream of compressor 19, thereby increasing recovery of primary components in high purity product 25. Optionally, sweep/permeate stream 15 is compressed in compressor 43 and passes to rectification system 45 which separates the stream into secondary product 47 which is enriched in the least volatile components and overhead stream 49 which is enriched in the most volatile components in stream 15. The pressure to which stream 15 is compressed depends upon the composition and components present therein; typically this pressure is 50–400 psig. Overhead stream 49 optionally can be combined with overhead stream 41, and combined stream 51 recycled to PSA system 23 by combining it with compressed primary component membrane product 17 downstream of compressor 19, thereby further increasing recovery of primary components in high purity product 25.

The most strongly adsorbed components in feed I typically are also the least volatile components in vapor/liquid separation systems much as rectification systems 37 or 45. In a typical refinery offgas mixture comprising hydrogen and $C_1$–$C_4$ hydrocarbons, for example, $C_4$ hydrocarbons are the most strongly adsorbed and also the least volatile, and thus secondary product 39 will be enriched in $C_4$ hydrocarbons. Secondary product 47 will be enriched in the less strongly adsorbed $C_3$ hydrocarbons, which in turn are more strongly adsorbed and less volatile than methane and $C_2$ hydrocarbons which wi 11 be withdrawn from rectification system 45 as overhead stream 49.

Pressure swing adsorption (PSA) systems for the separation of gas mixtures are well known in the art, and are widely used for example in the recovery and purification of hydrogen in the petroleum refining industry. One representative type of PSA system is disclosed in U.S. Pat. No. 4,077,779, the specification of which is incorporated herein by reference. In a typical PSA system for the recovery of hydrogen, a mixture of hydrogen and hydrocarbons is passed through one of a plurality of adsorber vessels containing one or more adsorbents such as activated carbon or zeolite, wherein the hydrocarbons are selectively adsorbed by the adsorbent, and a high purity hydrogen product is withdrawn from the adsorber. After a predetermined time period, the vessel is isolated and feed gas flows to another adsorber vessel. The isolated vessel is depressurized to desorb adsorbed hydrocarbons, which are withdrawn from the adsorber as a reject or waste stream. A purge step with product hydrogen sweeps residual hydrocarbons from the adsorber for recycle to feed, or an external purge gas may be employed and the purge gas utilized externally. Various pressure equalization steps between adsorbers may be employed to improve product recovery and reduce power consumption in the process.

Rectification systems 37 and 45 are preferably cryogenic separators such as cryogenic distillation columns or dephlegmators. Dephlegmators are essentially vertical heat exchangers having passages in each of which an upward-flowing feedstream is cooled by indirect refrigeration, thereby condensing some of the heavier mixture components which flow downward on the walls of the passages forming a reflux liquid. The liquid flows from the bottom of the cryogenic separator as the heavier product stream; the uncondensed components are withdrawn overhead as the light product.

EXAMPLE 1

Adsorbent membranes were made by coating porous (0.7 micron pore diameter) graphite substrate discs 4.5 inches in diameter with a thin film of an aqueous suspension (latex) containing a polyvinylidine chloride-acrylate terpolymer, drying the coated discs at 150° C. for five minutes, heating the discs in nitrogen to 1000° C. at a rate of 1° C. per minute, holding at temperature for three hours, and cooling to ambient temperature at 10° C. per minute. The polymer coating was carbonized during the heating step thereby forming an ultrathin layer of microporous carbon on the substrate discs. A laboratory plate-and-frame membrane module was constructed using five of these discs having a total membrane area of 0.385 sq ft.

The membrane module was operated at 12.2° F. using three different gas mixtures at a feed pressure of 4.5 atm (absolute pressure as used herein) and withdrawing permeate at a pressure of 1.1 atm. Compositions of the gas mixtures are given in Table 1.

TABLE 1

| Gas Mixture Compositions for Example 1 (Mole %) | | | |
|---|---|---|---|
| Component | Mixture A | Mixture B | Mixture C |
| Hydrogen | 40.9 | 60.1 | 29.6 |
| Methane | 20.2 | 19.8 | 60.1 |
| Ethane | 19.8 | 9.6 | 10.3 |
| Propane | 9.2 | 9.6 | — |
| Butane | 9.9 | — | — |

Membrane performance was measured such that greater than 90% of the heaviest hydrocarbon permeated through the membrane. A countercurrent methane sweep was maintained across the low pressure side of the membrane at 1.1 atm with a sweep to feed flow ratio of 0.05, 0.10, and 0.05 respectively for the three feed gas mixtures. The permeance, defined as P/1 where P is the permeability and 1 is the membrane thickness, was determined for each mixture component in the units of (std cc)/[(sq cm)(sec)(cm Hg)]. The selectivity S was calculated for each component in each mixture, where S is defined as the component permeance divided by the hydrogen permeance. Permeance of each component was determined using a logarithmic-mean partial pressure driving force across the membrane.

The measured results are given in Table 2 and clearly indicate the influence of the most strongly adsorbed components on the permeation characteristics of the less strongly adsorbing components. The most strongly adsorbed hydrocarbon reduces the permeance of the less strongly adsorbed hydrocarbon, and also reduces the hydrocarbon/hydrogen selectivity of the less strongly adsorbed components. The high degree of this reduction in permeance is significant and unexpected based on teachings of the prior art.

TABLE 2

Measured Permeance and Selectivity for Example 1

| Component | Mixture A P/l | Mixture A S | Mixture B P/l | Mixture B S | Mixture C P/l | Mixture C S |
|---|---|---|---|---|---|---|
| Hydrogen | 0.3 | 1.0 | 1.5 | 1.0 | 1.9 | 1.0 |
| Methane | 0.4 | 1.2 | 1.5 | 1.0 | 4.0 | 2.1 |
| Ethane | 0.7 | 2.0 | 4.3 | 2.8 | 16.3 | 8.4 |
| Propane | 1.5 | 4.5 | 8.1 | 5.4 | — | — |
| Butane | 5.0 | 14.6 | — | — | — | — |

In mixture A, the permeance of butane is the highest and the permeance values of the lighter hydrocarbons are lower; however, in the absence of butane (mixture B) the permeance values of the lower hydrocarbons and the selectivity with respect to hydrogen are enhanced significantly. A similar effect is observed between mixtures B and C. The behavior of ethane in each of the three mixtures clearly illustrates this unexpected behavior, wherein the ethane permeance increases by a factor of 24 from Mixture A (which contains both propane and butane) to Mixture C (which contains neither propane nor butane). This unexpectedly large increase in permeance occurs even though the partial pressure driving force of ethane across the membrane is lower by a factor of two in Mixture C than Mixture A.

Thus the permeance or permeability of a specific component in a gas mixture through an adsorptive membrane is affected significantly by the properties and compositions of the other components in the gas mixture. This differs from the well-known behavior of polymeric membranes in which the permeance or permeability of a specific component in a gas mixture is generally independent of the mixture composition and thus depends essentially on the partial pressure driving force of the specific component across the membrane. This unique property of adsorbent membranes can be exploited to fractionate hydrocarbon mixtures as earlier discussed and as illustrated in the additional examples which follow. By selecting the relative membrane surface areas in a series of membrane stages, an efficient fractionation can be realized which reduces the energy consumption in succeeding separation steps as compared with current commercially-practiced separation methods.

EXAMPLE 2

Figure 2:
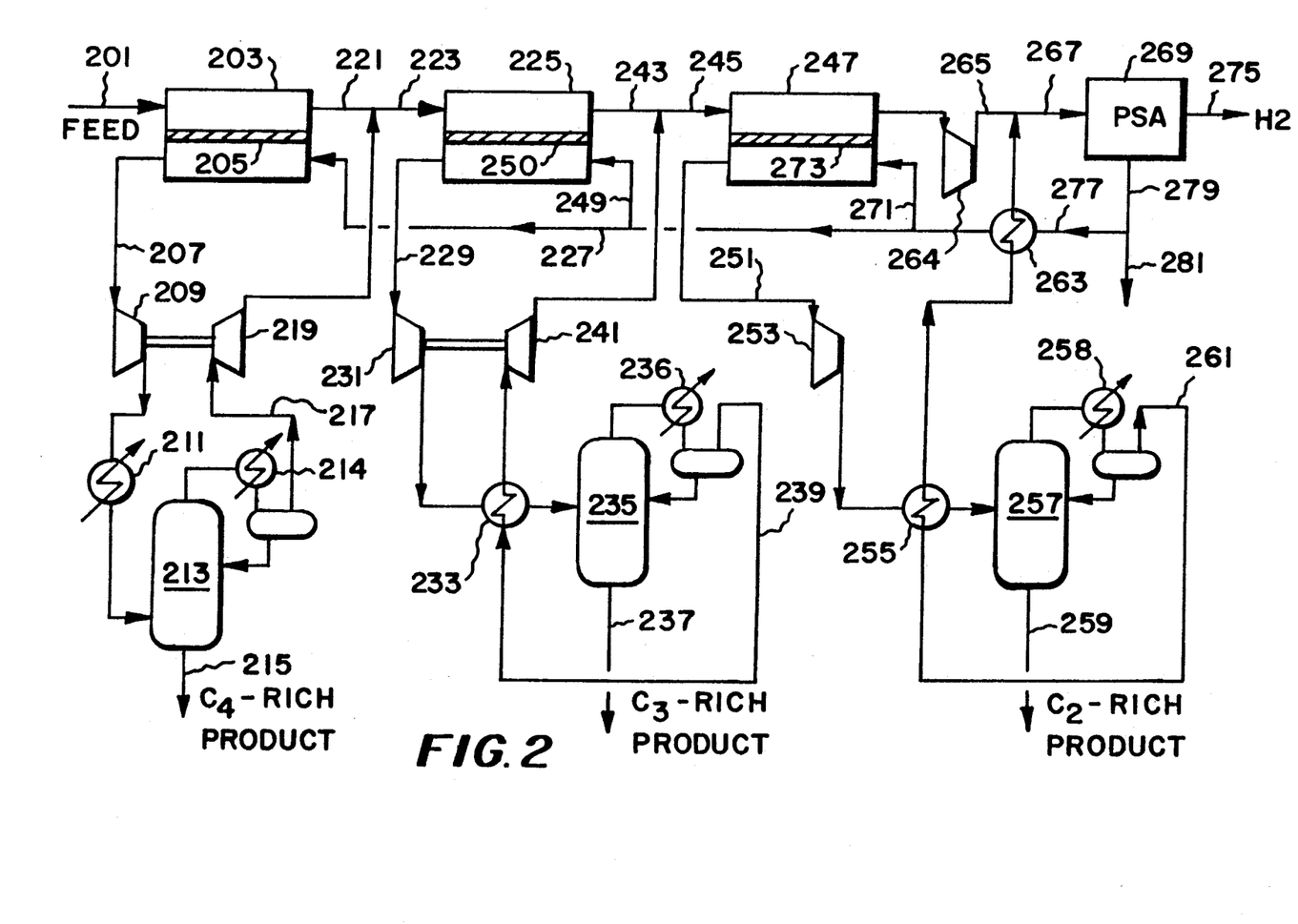
FIG. 2 is a schematic flowsheet for an alternate embodiment of the present invention as described in Example 2.

A process energy and material balance was carried out for the three stage membrane/cryogenic/pressure swing adsorption separation process illustrated in FIG. 2 using the selectivity data of Example 1 and simulating the pressure swing adsorption and cryogenic separation systems using known methods. The feed stream is identical to Mixture A of Example 1 and is available at 12.2° F. and 4.5 atm. The process is designed to reject 98% of the butane in the first membrane stage, 98% of the propane in the second membrane stage, and 984 of the ethane in the third membrane stage.

Referring to FIG. 2, feed 201 at 100 lb mol/hr passes to membrane module 203 containing membrane 205 and permeate plus sweep gas 207 is withdrawn therefrom at a pressure of 1.2 atm. This stream is compressed to 17 atm in compressor 209, cooled in refrigeration system 211 to 91.3° F., and introduced into rectification column 213. Butane-rich bottoms product stream 215 is withdrawn at 91.3° F. and overhead stream 217 at 1.6° F. is expanded through expander 219 to about 4.5 atm and is combined with nonpermeate stream 221 from membrane zone 203 to form feed 223 at 12.2° F. to the next membrane zone 225. The permeate side of membrane zone 203 is swept with sweep gas 227 which is a portion of reject gas 279 from PSA system 269 to enhance the permeability through membrane 205.

Permeate plus sweep gas 229 is withdrawn from membrane zone 225 at a pressure of 1.2 atm. This stream is compressed to 17.1 atm in compressor 231, cooled in heat exchanger 233 to 28.3° F., and introduced into rectification column 235. Propane-rich bottoms product stream 237 is withdrawn at −2.2° F.; overhead stream 239 at −77.9° F. provides cooling in exchanger 233, TS expanded through expander 241 to about 4.55 atm, and is combined with nonpermeate stream 243 from membrane zone 225 to form feed 245 at 7.8° F. to the next membrane zone 247. The permeate side of membrane zone 225 is swept with sweep gas 249 (identical in composition to sweep gas 227) to enhance the permeability through membrane 250.

Permeate plus sweep gas 251 is withdrawn from membrane zone 247 at a pressure of 1.2 atm. This stream is compressed to 17.1 atm in compressor 253, cooled in heat exchanger 255 to −51.7° F., and introduced into rectification column 257. Ethane-rich bottoms product stream 259 is withdrawn at −68.6° F.; overhead stream 261 at −150° F. provides cooling in exchanger 255, is warmed in exchanger 263, and is combined with compressed nonpermeate stream 265 from membrane zone 247 to form feed 267 at 100° F. and 17.0 atm to pressure swing adsorption (PSA) system 269. The permeate side of membrane zone 247 is swept with sweep gas 271 (identical in composition to sweep gas 227) to enhance the permeability through membrane 273.

PSA system 269 is a multiple-bed cyclic adsorption unit as known in the art which produces hydrogen product 275 at 99.99+ vol % purity. A portion 277 of PSA reject 279 provides sweep gas streams 227, 249, and 271 at 1.3 atm and ambient temperature. The remainder 281 of the reject 279 is used elsewhere as fuel. Membranes 205, 250, and 273 comprise membrane material prepared by the method of Example 1.

A summary of key stream properties for the example is given in Table 3. The recoveries of butane, propane, and ethane from feed 201 in liquid product streams 215, 237, and 259 are 96.1%, 71.3%, and 73.6% respectively. Hydrogen recovery from feed 201 is 79.4%.

TABLE 3

STREAM SUMMARIES FOR EXAMPLE 2 (FIG. 2)

| STREAM NO. | 201 | 207 | 215 | 223 | 229 | 237 | 245 | 251 | 259 | 267 | 275 | 279 |
|---|---|---|---|---|---|---|---|---|---|---|---|---|
| Composition, | | | | | | | | | | | | |

TABLE 3-continued

STREAM SUMMARIES FOR EXAMPLE 2 (FIG. 2)

| STREAM NO. | 201 | 207 | 215 | 223 | 229 | 237 | 245 | 251 | 259 | 267 | 275 | 279 |
|---|---|---|---|---|---|---|---|---|---|---|---|---|
| Mole Fraction | | | | | | | | | | | | |
| Hydrogen | 0.409 | 0.303 | 0.005 | 0.463 | 0.397 | 0.006 | 0.498 | 0.374 | 0.005 | 0.588 | 0.9999 | 0.251 |
| Methane | 0.202 | 0.192 | 0.019 | 0.255 | 0.263 | 0.038 | 0.322 | 0.359 | 0.088 | 0.389 | tr | 0.707 |
| Ethane | 0.198 | 0.207 | 0.095 | 0.204 | 0.241 | 0.281 | 0.179 | 0.265 | 0.896 | 0.023 | tr | 0.042 |
| Propane | 0.092 | 0.130 | 0.181 | 0.070 | 0.094 | 0.639 | 0.002 | 0.003 | 0.010 | 0.000 | 0.000 | 0.000 |
| Butane | 0.099 | 0.167 | 0.700 | 0.004 | 0.005 | 0.037 | 0.000 | 0.000 | 0.001 | 0.000 | 0.000 | 0.000 |
| Flow, lb mol/hr | 100 | 58 | 13.6 | 91.6 | 70.5 | 10.3 | 90.7 | 58.8 | 16.3 | 78.9 | 35.5 | 43.4 |
| Pressure, Atm (abs) | 4.5 | 1.2 | 17.0 | 4.4 | 1.2 | 17.0 | 4.3 | 1.2 | 17.0 | 17.0 | 17.0 | 1.3 |
| Temperature, °F. | 12.2 | 12.2 | 91.3 | 12.2 | 12.2 | −2.2 | 12.2 | 12.2 | −68.6 | 100 | 100 | 100 |

Refrigeration for overhead condensers 214, 236, and 258 is provided respectively by a 2-stage propylene refrigeration system, a 3-stage ethylene/2-stage propylene system, and a 3-stage ethylene/2-stage propylene system. Compression power for these refrigeration systems was calculated by standard methods to be 146 HP. Net compression power for compressor 209 including power recovery by expander 219 was calculated at 84.4 HP, and net compression power for compressor 231 including power recovery by expander 241 was calculated at 118.7 HP. Additional power required was calculated at 33.5 HP for PSA compressor 264 and 118.2 HP for compressor 253. The total power requirement therefore is 500.8 HP based on feed 201 at 100 lb mol/hr.

EXAMPLE 3

Figure 3:
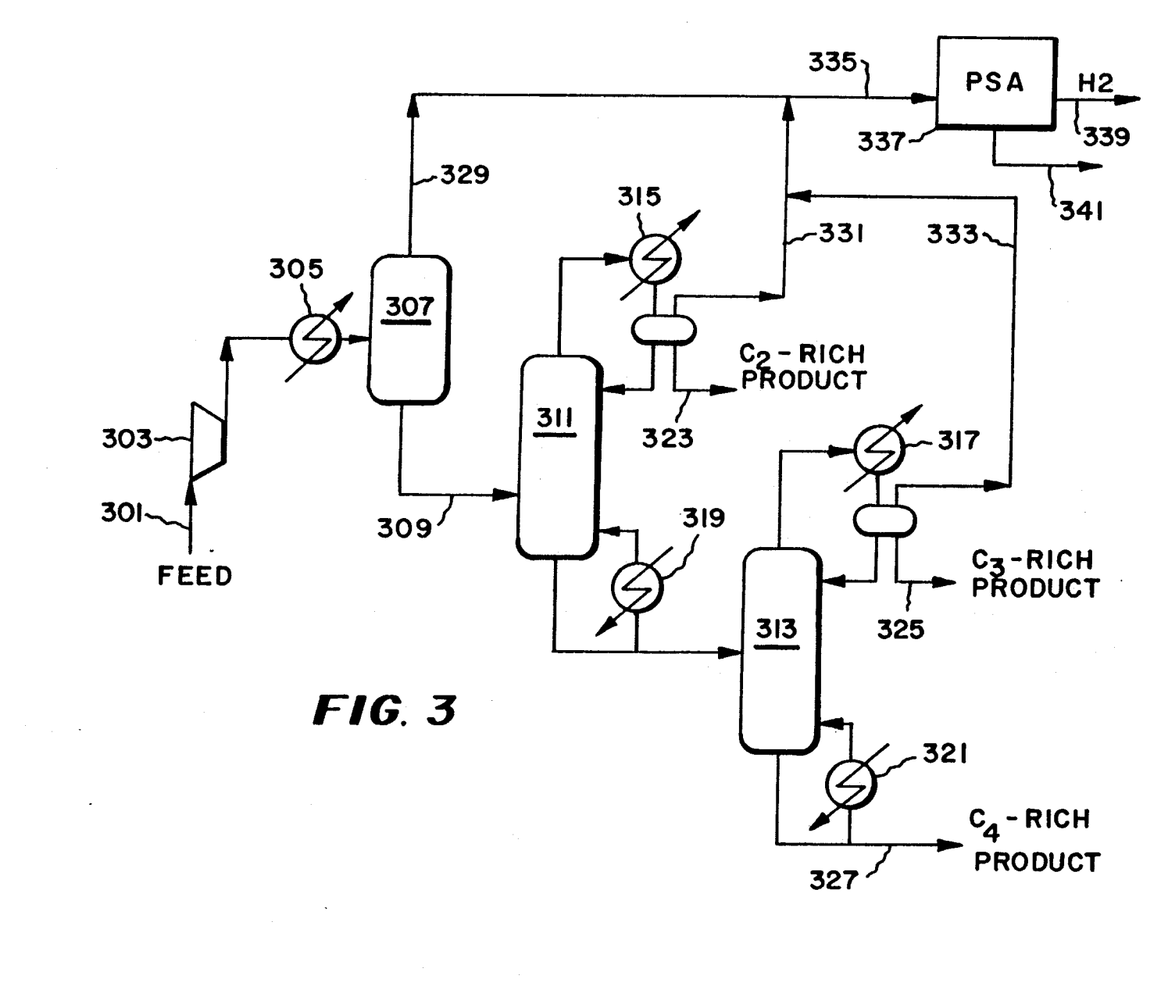
FIG. 3 is a schematic flowsheet for a prior art separation method for comparison with the present invention in Example 3.

A conventional cryogenic distillation/PSA system was simulated for the recovery of hydrogen and hydrocarbons from the same feed gas of Example 2 for comparison with the method of the present invention as illustrated in Example 2. Referring to FIG. 3, feed 301 at 100 lbmol/hr, 4.5 atto, and 12.2° F. is compressed to 17 atm in compressor 303 cooled to −150° F. in refrigeration system 305, and passed to separator drum 307. Liquid 309 therefrom is separated by a typical cryogenic distillation system consisting of distillation columns 311 and 313 which utilize overhead condensers 315 and 317 respectively and steam reboilers 319 and 321 respectively. The columns are operated at 17 atm, and the temperatures and product withdrawal rates are adjusted to yield individual hydrocarbon recoveries similar to Example 2. Ethane-rich product liquid 323 is taken overhead from column 311, propane-rich liquid product 325 is taken overhead from column 313 and butane-rich liquid product 327 is taken as bottoms from column 313. Hydrogen-rich vapor 329 is combined with vapor overhead streams 331 and 333, and combined stream 335 provides feed 335 to PSA system 337 which yields high-purity hydrogen product 339 and reject gas 341.

Compression power required for the cryogenic/PSA process of FIG. 3 was calculated and yielded the following: 80.7 HP for feed gas compressor 303; 155 HP for 3-Stage ethylene and 217.6 HP for 2-stage propylene refrigeration systems for feed cooler 305; 30 HP for 3-stage ethylene and 85.4 HP for 2-stage propylene refrigeration systems for condenser 315; and 6.1 HP for a 2-stage propylene refrigeration system for condenser 317. The total compression power required for the cryogenic/PSA process of FIG. 3 is thus 574.8 HP, In addition, steam at 0.7 MMbtu/hr total is required for reboilers 319 and 321.

A comparison of the power requirements for the method of the present invention (Example 2) with those of the cryogenic/PSA process of Example 3 shows clearly that the present invention is more efficient than conventional technology for the separation of hydrogen/hydrocarbon mixtures. The total compression power for the adsorbent membrane/cryogenic/PSA process was calculated at 501.2 HP compared with 574.8 HP for the conventional cryogenic/PSA process, which is a 14.7% reduction in power. The lower power is due to reduced refrigeration duty for cryogenic separators 213, 235, and 257 of FIG. 2, which is realized from the enriched hydrocarbon feed streams to the separators. The feed gas is selectively fractionated by the adsorbent membranes so that only the hydrocarbon-rich streams are sent to the cryogenic separators, thus yielding the reduced refrigeration requirements. Clearly the process of the present invention as illustrated in Example 2 provides a significant improvement in process efficiency compared with known conventional technology.

The present invention thus utilizes the unique fractionation properties of adsorbent membranes to separate a gas mixture into a non-permeate primary component product and two or more secondary permeate products, one of which contains more strongly adsorbed and thus more permeable components and another of which contains less strongly adsorbed and thus less permeable components. Increased recovery of the primary components is realized by further treatment of the membrane non-permeate product by pressure swing adsorption (PSA) and utilizing the PSA reject gas to swing the permeate side of the adsorbent membrane stages. Further separation of the permeate/sweep gas streams yields additional recovery of primary components product and enriched secondary component products. The unique combination of an energy-efficient continuous membrane process, a PSA system, and cryogenic separation yields high recovery of high purity primary component product and substantially pure secondary products. Because the adsorbent membrane process operates at a lower feed pressure than PSA systems and provides a PSA feed substantially enriched in primary components, compression power and equipment size are reduced compared with other process combinations. Further, since the secondary components are enriched prior to processing in the cryogenic separators, further separation therein is achieved with reduced equipment size and refrigeration requirements. The overall process combination therefore is more energy efficient than prior art separation methods.

The present invention is particularly useful for recovering hydrogen and light hydrocarbons from petroleum refinery offgas streams containing these components. It is also applicable to the recovery and purification of helium or methane as the primary component. In hydrogen recovery, the use of adsorbent membranes enriches the PSA feed hydrogen content thereby reducing the gas flow and compression power needed for the PSA system. Further, the sweep/permeate reject streams are substantially enriched in $C_3$ and $C_4$ hydrocarbons respectively, thereby reducing compression and refrigeration requirements in the dephlegmator system to produce $C_4$-rich and $C_3$-rich products.

The staged adsorbent membrane system of the present invention exhibits unique advantages over staged polymeric membranes for hydrogen recovery. First, since hydrogen preferentially permeates through polymeric membranes, the hydrocarbon partial pressure increases on the feed side of each membrane stage which can cause condensation of hydrocarbon liquid in the membrane stages—an undesirable occurrence. Such feed side condensation is avoided in the present invention since the hydrocarbons permeate through the membrane and exhibit decreasing partial pressures on the feed side of each membrane stage. Second, fractionation of the hydrocarbon components as permeate streams is achieved by the method of the present invention, but fractionation performance of the degree possible with adsorbent membranes is not possible with staged polymeric membranes.

The essential characteristics of the present invention are described completely in the foregoing disclosure. One skilled in the art can understand the invention and make various modifications thereto without departing from the basic spirit thereof, and without departing from the scope and range of equivalents of the claims which follow.

We claim:

1. A method for separating a gas mixture containing one or more primary components and two or more secondary components, wherein said secondary components are more strongly adsorbed on an adsorbent material than said primary components, and wherein the relative adsorptive characteristics of said secondary components on said adsorbent material range from most strongly adsorbed secondary components to least strongly adsorbed secondary components, said method comprising:

(a) passing a feed stream comprising said gas mixture successively through two or more membrane zones in series, each membrane zone having a permeable adsorbent membrane comprising said adsorbent material which divides the zone into a feed side and a permeate side, wherein said feed stream passes successively in series through the feed side of each membrane zone such that the nonpermeate gas from a given membrane zone provides the feed to the succeeding membrane zone, wherein said feed stream is depleted of the most strongly adsorbed secondary components in the first of said membrane zones and the least strongly adsorbed secondary components in the last of said membrane zones, and withdrawing from the feed side of the last of said membrane zones a final membrane product stream substantially depleted of said secondary components; and (b) withdrawing from the permeate side of each successive membrane zone a secondary component permeate stream, wherein the permeate stream from the first of said membrane zones is enriched in the most strongly adsorbed secondary components and the permeate stream from the last of said membrane zones is enriched in the least strongly adsorbed secondary components;

wherein portions of said secondary components are adsorbed from said feed stream in said successive membrane zones by said adsorbent membranes, diffuse through the membranes as an adsorbed fluid phase, and are withdrawn from the permeate sides of said successive membrane zones to yield said secondary component permeate streams.

2. The method of claim 1 wherein said one or more primary components comprise hydrogen, helium, or methane.

3. The method of claim 2 wherein said two or more secondary components are selected from the group consisting of hydrocarbons having up to five carbon atoms, carbon monoxide, carbon dioxide, and nitrogen, and hydrogen sulfide.

4. The method of claim 1 wherein said adsorbent material is selected from the group consisting of activated carbon, zeolite, activated alumina, silica, and combinations thereof.

5. The method of claim 1 wherein the pressure in said feed side of each membrane zone is between 20 and 1,200 psig.

6. The method of claim 5 wherein the pressure in said permeate side of each membrane zone is between 2 and 900 psig.

7. The method of claim 6 wherein the ratios of feed side pressure to permeate side pressure in said membrane zones are substantially equivalent.

8. The method of claim 1 which further comprises passing said final membrane product stream into a pressure swing adsorption system and withdrawing therefrom a high purity primary component product and a reject stream comprising secondary components.

9. The method of claim 8 which further comprises passing at least a portion of said reject stream through the permeate side of one of said membrane zones as a sweep gas, and withdrawing therefrom a membrane zone reject stream comprising said sweep gas and an enhanced permeate stream comprising secondary components, whereby the use of said sweep gas increases the diffusion rate of secondary components through said permeable adsorbent membrane.

10. The method of claim 9 which further comprises passing said membrane zone reject stream to a rectification system and withdrawing therefrom a secondary component product stream enriched in the least volatile of the secondary components in said membrane zone reject stream and an overhead stream enriched in the most volatile of the secondary components in said membrane zone reject stream.

11. The method of claim 10 wherein said rectification system is a dephlegmator or cryogenic distillation column.

12. The method of claim 10 which further comprises combining said overhead stream with said final membrane product stream prior to said pressure swing adsorption system.

13. The method of claim 9 which further comprises passing another portion of said reject stream through the permeate side of another of said membrane zones as a sweep gas, and withdrawing therefrom an additional membrane zone reject stream comprising said sweep gas and another enhanced permeate stream comprising secondary components, whereby the use of said sweep gas increases the diffusion rate of secondary components through said permeable adsorbent membrane.

14. The method of claim 13 which further comprises passing said additional membrane zone reject stream to an additional rectification system and withdrawing therefrom an additional secondary component product stream enriched in the least volatile of the secondary components in said additional membrane zone reject stream and an additional overhead stream enriched in the most volatile of the secondary components in said additional membrane zone reject stream.

15. The method of claim 14 which further comprises combining said additional overhead stream with said final membrane product stream prior to said pressure swing adsorption system.

16. The method of claim 14 wherein said rectification system is a dephlegmator or a cryogenic distillation column.

17. The method of claim 8 wherein said final membrane product stream is compressed to between 100 and 1200 psig prior to said pressure swing adsorption system.

* * * * *